May 22, 1962  J. C. LARSON  3,035,795
CONTROL APPARATUS
Filed Nov. 27, 1959  2 Sheets-Sheet 1

INVENTOR
JOHN C. LARSON
BY Gordon L. Reed
ATTORNEY

May 22, 1962     J. C. LARSON     3,035,795
CONTROL APPARATUS

Filed Nov. 27, 1959     2 Sheets-Sheet 2

INVENTOR
JOHN C. LARSON
BY *Gordon Reed*
ATTORNEY

United States Patent Office 3,035,795
Patented May 22, 1962

3,035,795
CONTROL APPARATUS
John C. Larson, Minneapolis, Minn., assignor to Minneapolis-Honeywell Regulator Company, Minneapolis, Minn., a corporation of Delaware
Filed Nov. 27, 1959, Ser. No. 855,636
11 Claims. (Cl. 244—77)

The present invention relates to control apparatus and more particularly to automatic control apparatus for an aircraft for controlling it about one of its three axes.

In the present instance, the control apparatus controls the aircraft about its pitch axis although it is to be understood that the principles of the invention may be utilized to control the craft about any of its three respectively perpendicular axes. Furthermore, in the form of the invention described while the aircraft will be automatically controlled by a synthetic altitude displacement signal, the same teaching could be applied to control the craft automatically from a pitch attitude displacement signal, Mach displacement signal or similar control quantities of synthetic form.

An aircraft in flight is subject to exterior transient disturbances which cause it to change pitch attitude, and such changes in attitude cause the craft to depart from its initial altitude. These disturbances tending to change the aircraft pitch attitude upwardly in general equal the number of disturbances tending to change craft atitude downwardly, over a long period of time.

The disturbances may occur at infrequent intervals and thus the type of such disturbance may be considered of a low frequency. However the disturbances also may occur at high frequencies that is the time period between disturbances may be rather brief.

Altitude sensors are available for sensing departure of the craft from a desired altitude which may result from said changes in pitch attitude. However, if the frequencies of such altitude departures due to the frequencies of the pitch attitude disturbances is high, the altitude displacement signal as sensed does not correspond with the actual departure in altitude of the craft because of the lagging response of the sensor.

Altitude rate sensing devices are available for sensing altitude rate or departure rate of a craft from a desired altitude. Such altitude rate sensing devices provide a satisfactory control signal for medium frequency changes in craft altitude. However such rate sensing devices may not be sensitive enough to detect slow departures of craft altitude and while satisfactory for medium frequency rates of disturbance are unsuited for low frequency rates of altitude disturbance.

However, by taking the sensed altitude displacement signal which at certain frequencies has its greatest accuracy or conformance with the actual altitude error and integrating the sensed altitude rate signal in its frequency area of greatest accuracy to obtain the actual altitude error, and combining the two signals, a synthetic altitude displacement signal is obtained over the entire range of altitude departures frequencies, for maintaining the aircraft automatically at its desired altitude.

An object therefore of this invention is to provide a synthetic displacement signal derived from displacement deviation and displacement rate deviation derived from suitable sensing devices.

A further object of this invention is to obtain a synthetic displacement signal from a displacement error as sensed and various derivative quantities of the displacement error obtained from other sensors.

A further object of this invention is to provide a novel apparatus for automatically controlling the craft to a desired position.

A further object of this invention is to provide a novel flight control apparatus for maintaining the aircraft at a desired altitude utilizing a synthetic displacement signal.

In a sense, further objects of the invention are threefold, first, to improve the quality of signals that are poor at high frequencies, i.e., improve the bandwidth through signal blending; second, to minimize unwanted disturbing noise signals throughout the frequency range of interest; third, to better performance in the presence of undesirable nonlinearities (threshold and hysteresis) by blending with signals not subject to these nonlinearities such that the effect of these nonlinearities will only be noted at the very low frequencies; consequently, any limit cycle oscillation will in this way be made to have a longer period. A ±50 foot oscillation with sixty second period is perhaps noticeable but not disturbing to a pilot of an aircraft. A ±50 foot oscillation with fifteen second period however is most annoying to a pilot.

The above and other objects and advantages of the invention will appear more fully hereinafter from a consideration of a detailed description which follows of a preferred embodiment taken together with the accompanying drawings where various embodiments of the invention are illustrated. It is understood however that the drawings are for the purpose of illustration and description only and are not intended as a definition of the limits of the invention.

Generally speaking, all automatic flight control systems for aircraft have problems of various order and magnitude in attaining an optimum attitude or altitude hold mode of operation. The invention as disclosed herein for purpose of illustration relates to the altitude hold mode of operation. In the automatic altitude hold mode of operation, some or all of the difficulty in holding altitude is concentrated in the pressure altitude sensor which provides displacement signals. The shortcomings of this altitude displacement sensor such as pneumatic transmission lags, threshold, resolution, linearity, hysteresis, dynamics, etc. are amplified by the expanded flight envelopes involving higher speeds and higher altitudes of modern high performance aircraft.

What may be termed inertial altitude displacement signals derived for example from accelerometers and altitude displacement signals derived from altitude rate devices can be used for augmentation of the barometric pressure altitude displacement signal to minimize the effects of the imperfect air data sensor and the lags associated with the aircraft static pressure source. This augmentation is termed "blending" here and is accomplished with first-order lag networks which may selectively be integrating amplifiers, passive lag networks, or of the motor operated type.

Such blended altitude displacement signal may be utilized in the altitude hold mode along with altitude rate signals in an automatic pilot of an aircraft for maintaining the desired altitude. With the broad concepts thus described the manner of improvisation of the concepts will be considered by referring firstly to the drawings wherein:

FIGURE 1 shows a conventional amplitude-frequency response curve of altitude rate $\dot{h}$ when passed through a lag device having a transfer function of the form $$\frac{1}{1+T_2s}$$

Figure 1:
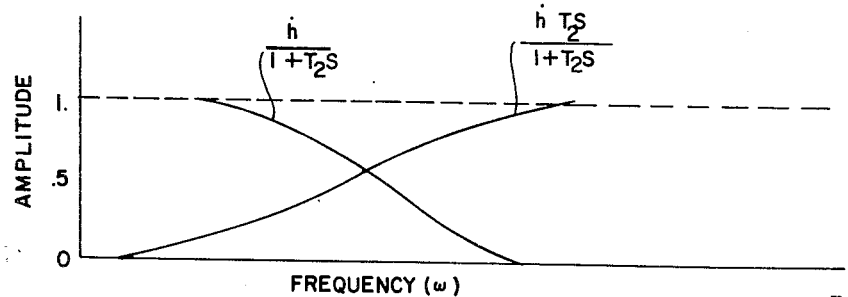
FIGURE 1 illustrates in graphical form the blending principles for obtaining a synthetic altitude rate signal.

FIGURE 1 also shows a curve or graph of a derived altitude rate from an inertial sensing device or accelerometer having a gain constant $T_2$ when also passed through the same lag device with the transfer function $$\frac{1}{1+T_2s}$$

The two curves show that the rate sensor has a correct output at low frequencies and incorrect output at high frequencies whereas the acceleration sensor response is somewhat opposite that of the rate sensor. When the ordinates for the two curves or graphs are summed, there is obtained an amplitude function equal to 1 or full altitude rate over the entire frequency range of interest. Thus we obtain a "blended" altitude rate, $\dot{h}_b$, for example, equal to the actual altitude rate irrespective of the frequencies of disturbances of an aircraft causing rate changes thereof. In the above figure $T_2$ is a time constant and $s$ is the conventional mathematical operator denoting differentiation.

The above principle while applied to obtaining a rate signal is also applicable to obtaining a displacement signal so that a "blended" altitude displacement signal may be obtained from a sensor responsive to altitude changes and devices responsive to craft rate and craft vertical acceleration which augment the basic displacement signal.

Figure 2:
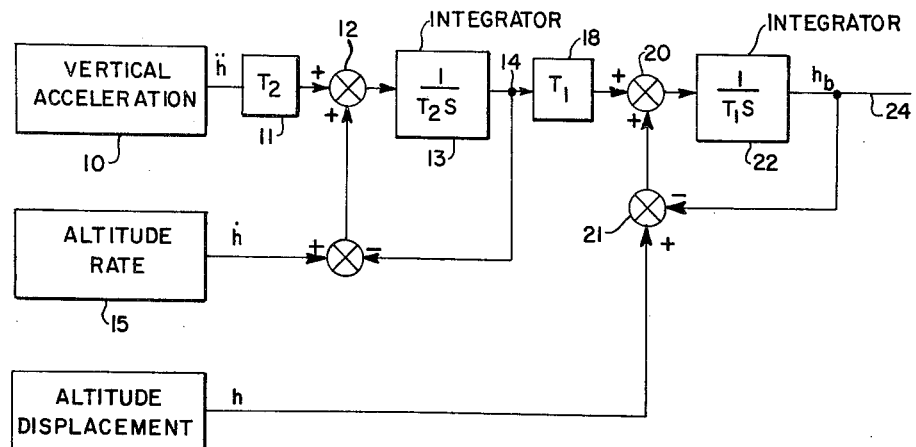
FIGURE 2 shows in block one arrangement for obtaining a synthetic altitude displacement signal derived from inertial, rate, and altitude signals.

In FIGURE 2 an arrangement for effecting mathematical manipulations is provided for obtaining a blended altitude displacement signal ($h_b$). The figure comprises a subassembly consisting of a vertical acceleration sensing device 10 providing a vertical acceleration signal $\ddot{h}$ which quantity is modified by a gain control device 11 having a gain factor of a magnitude $T_2$ which supplies its output to a summing terminal 12. An altitude rate signal $\dot{h}$ is derived from an altitude rate device 15. The subassembly also includes an integrator 13 with a transfer function $$\frac{1}{T_2s}$$

which is provided with a feedback arrangement so that it functions as a lag device having the transfer function $$\frac{1}{1+T_2s}$$

The absolute magnitude of the gain factor $T_2$ is equal to the time constant $T_2$ of the integrator 13 as the common symbol implies. It will be appreciated and can be easily demonstrated that of the total output at point 14 or the output of integrator 13 the portion thereof from the altitude rate device 15 equals $$\frac{\dot{h}}{1+T_2s}$$

It also can be readily shown that the other portion or output at terminal 14 derived from the vertical acceleration the device 10 is equal to $$\frac{\ddot{h}T_2}{1+T_2s}$$

Further, vertical acceleration being the derivative of altitude rate we may substitute $s\dot{h}$ for $\ddot{h}$ to obtain the expression $$\frac{\dot{h}T_2s}{1+T_2s}$$

as the output at point 14 from the vertical acceleration device 10. Combining the two we have $$\frac{\dot{h}}{1+T_2s}+\frac{\dot{h}T_2s}{1+T_2s}$$

or $$\dot{h}\frac{(1+T_2s)}{1+T_2s}$$

as a "blended" altitude rate signal or synthetic rate signal. This "blended" altitude rate signal comprises the separate quantities having their frequency response characteristics illustrated in FIGURE 1. From the above, at high frequencies, the output at 14 is obtained from the vertical accelerometer; also the output at 14 is from altitude rate sensor 15.

The blended altitude rate appearing at terminal 14 passes through a gain device 18 having the transfer function $T_1$ and the output from the gain device 18 is supplied to a summing point 20. An altitude displacement sensing device 19 responsive to changes in craft altitude from a predetermined altitude supplies a displacement signal $h$ to a summing point 21. Also supplied to summing point 21 is a feedback from the output of an integrator 22 having the transfer function $$\frac{1}{T_1s}$$

which is provided with a feedback arrangement so that it functions as a lag device having the transfer function $$\frac{1}{1+T_1s}$$

The difference between altitude displacement $h$ and the feedback from integrator 22 is added to the output of gain device 18 at summing point 20 where it is supplied to the integrator 22. The output of the integrator 22 is the blended altitude displacement signal appearing on output member 24. It can be shown mathematically the output ($h_b$) at conductor 24 is equal to $$\frac{h}{1+T_1s}+\frac{T_1}{1+T_1s}\left(\frac{\dot{h}+T_2\ddot{h}}{1+T_2s}\right)$$

which is reduced to $$h_b=\frac{h+T_2sh+T_1\dot{h}+T_1T_2\ddot{h}}{(1+T_1s)(1+T_2s)}$$

and it thus is derived from devices responsive to $h$, $\dot{h}$, and $\ddot{h}$. In the arrangement of FIGURE 2, the time constants of the integrators 13 and 22 are in the order of 10 to 20 seconds. For example, the time constant of the integrator 22 is much larger than the time lag in response of the altitude displacement sensor 19 to changes in altitude, consequently the lag of the altitude displacement sensing device 19 is small in its effect on the output of integrator 22 and may therefore be neglected. The same is equally true of integrator 13 whose time constant $T_2$ is considerably larger than the time constant or lag in the altitude rate sensing device 15 thus the effect of the time lag in sensor 15 to changes in altitude rate may be neglected.

The above arrangement therefore because of the large time constants is different from an arrangement shown in a prior patent of Remus N. Bretoi, 2,953,733, filed October 17, 1955, wherein, FIGURE 1 includes an arrangement for obtaining a lagged pitch attitude and wherein pitch rate is applied to a gain device 82 and thereafter applied to the integrator 55 to which integrator the pitch attitude signal from transmission means 41 is supplied. In the Bretoi arrangement, the time constant of the integrator 55 was in the nature of ½ to 2½ seconds at the most whereas in the present arrangement the time constant of the integrator is large in comparison, consequently the output of the integrator in the present arrangement aside from using altitude rather than pitch attitude signals as in Bretoi is utilized for a different purpose than is the output of the integrator in the Bretoi arrangement.

Figure 3:
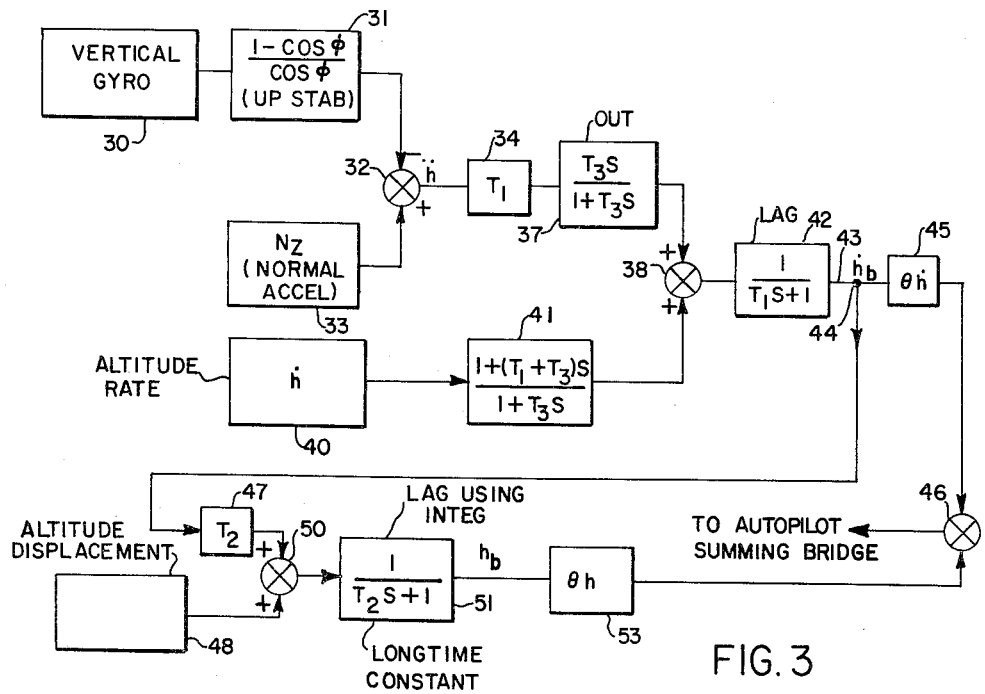
FIGURE 3 shows a block diagram of a preferred arrangement for controlling altitude through an automatic flight control system for an aircraft.

FIGURE 3 shows a preferred arrangement for obtaining a "blended" altitude displacement signal, $h_b$, which may be summed with an altitude rate signal, $\dot{h}$, and utilized in an automatic flight control system in the altitude hold mode for control of the craft. In FIGURE 3, and considering the fact while the craft is holding altitude that effects of bank angle $\phi$ on an accelerometer, that in ordinary operation is used for sensing craft acceleration along the z axis to thereby normally obtain vertical acceleration, alters its response by the expression $$\frac{1-\cos\phi}{\cos\phi}$$

a vertical gyroscope 30 responsive to changes in bank angle of the craft supplies a roll attitude signal to a modification device 31 whose output is supplied to a summing terminal 32. An accelerometer 33 responsive to normal accelerations or accelerations of the craft along its normally vertical or z axis has its output supplied to the summing terminal 32. From summing point 32 there is therefore derived a vertical acceleration which is the algebraic sum of the incremental load factor or acceleration along the z axis as a function of roll angle $\phi$ developed from the single phase output from the vertical gyroscope 30 and the normal acceleration developed by accelerometer 33. The algebraic sum of these two signals is the craft vertical acceleration or altitude acceleration which after modification by a gain device 34 passes through a high-pass network 37 having roughly a time constant of 10 seconds. Thereafter it is summed at summing point 38 with a barometric altitude rate signal and applied to a lag network 42 having a fourteen second time constant.

The high-pass network 37 effect on the acceleration is used to stop any 1G steady state output from the vertical acceleration sensing accelerometer and to minimize the effects of errors in the mechanization of the output from device 31. It is desirable to have as long a time constant as possible in the high-pass network 37 for analytical purposes, however practical reasons in the mechanization dictated the ten-second or lower time constant. To compensate for this lower time constant of network 37, the barometric rate intput obtained from an altitude rate sensing device 40 is passed through a lead network 41 which compensates for the loss in low frequency signals from gyro 30 and accelerometer 33 due to the high-pass network 37. Network 37 functions to cancel steady state attitude and acceleration signals. The output of network 41 is summed at terminal 38 with the acceleration input and is then transmitted to the lag device 42.

The output of the lag device 42 which appears on output member or terminal 43 is termed a blended altitude rate, $\dot{h}_b$. The same blending scheme is continued by transmitting $\dot{h}_b$ to a gain device 47 and thereafter summing the modified blended rate $\dot{h}_b$ T$_2$ with barometric displacement into an equivalent fourteen second lag network 51. To this end, the output $\dot{h}_b$ on member 43 after passing through a gain device 47 having a time constant T$_2$ is summed at point 50 with an altitude displacement signal derived from an altitude sensor 48. The sum is then transmitted to the lag device 51. The output of the lag device 51 is termed a "blended" displacement, $h_b$.

The blended rate on output member 43 after passing through a gain device 45 is combined with blended displacement $h_b$ after it passes through a gain device 53, at summing point 46. The output from summing point 46 is thence fed into a summing point of an automatic flight control system, pitch control channel. $\theta\dot{h}$ is the gain on the $\dot{h}$ signal, i.e., degrees pitch attitude per foot per second of altitude. $\theta h$ is the gain on the altitude signal or degrees pitch attitude change per foot of altitude.

Figure 4:
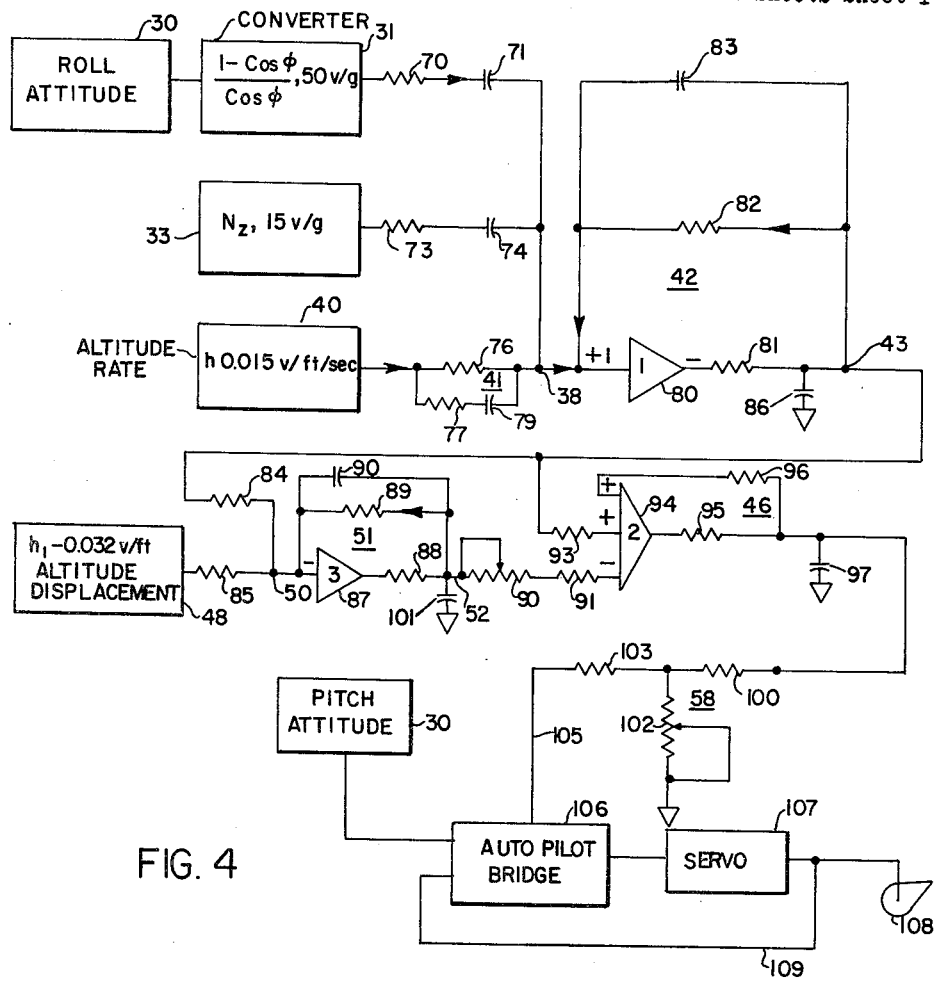
FIGURE 4 is an electrical schematic mechanization of the concept for operation of an automatic flight control system for an aircraft.

FIGURE 4 is a mechanization of the block diagram of FIGURE 3 with the addition of the conventional autopilot bridge and servomotor for operating the elevator control surface of an aircraft. Such autopilot signal bridge and servo have been heretofore provided as in a prior patent of Robert G. Weber, No. 2,944,768, filed December 13, 1955, showing a pitch channel of an automatic pilot which may assume a altitude hold mode when a function selector 161 is placed in the "A" position.

For the embodiment of FIGURE 4, the values of the resistors and condensers of one mechanization of the invention are tabulated. In the arrangement, the resistances where designated are given in megohms or else are given in kiloohms. The values of the capacitors are in microfarads.

*Tabulation of Resistor Capacitor Values*

| | |
|---|---|
| Resistor 70 | 2.5M |
| Resistor 73 | 75K |
| Resistor 82 | 2M |
| Resistor 76 | 180K |
| Resistor 77 | 128K |
| Resistor 81 | 12K |
| Resistor 84 | 62K |
| Resistor 85 | 820K |
| Resistor 89 | 2M |
| Resistor 88 | 12K |
| Resistor 90 | 500K |
| Resistor 91 | 510K |
| Resistor 93 | 360K |
| Resistor 95 | 12K |
| Resistor 96 | 180K |
| Resistor 100 | 1M |
| Resistor 102 | 120K |
| Resistor 103 | 560K |
| Capacitor 71 microfrads | 150 |
| Capacitor 74 do | 4.5 |
| Capacitor 79 do | 78 |
| Capacitor 83 do | 20 |
| Capacitor 86 do | 0.5 |
| Capacitor 90 do | 20 |
| Capacitor 97 do | 0.5 |
| Capacitor 101 do | 0.5 |

Additionally, the various gains for the signal sensors are given for example, altitude rate is given at .015 volt for each foot per second of altitude rate. Again the barometric altitude signal sensed is given at .032 volt per foot change of altitude. FIGURE 4 shows also that electrical signals of direct voltage are provided and such signals are arranged in a D.C. parallel summing arrangement. However, this arrangement is merely for the purpose of illustration and A.C. signals may be provided by the sensors and may be combined in lag networks utilizing motor operated integrators to provide first order lag arrangements. The various devices responsive to aircraft accelerations along its z axis, rate of change of altitude, and altitude error or altitude displacement from a selected altitude are old in the art and the novelty herein is not dependent upon the novelty of such individual components.

In FIGURE 4, a vertical gyroscope 30 responsive to roll attitude of the craft provides a correction signal having a single phase irrespective of the direction of bank to a converter 31 which modifies the signal in accordance with the ratio $$\frac{1-\cos\phi}{\cos\phi}$$

where $\phi$ is the bank attitude of the craft.

The output from the conversion arrangement 31 is supplied through a resistor 70 and high pass capacitor 71 to summing point 38. The normal acceleration signal from accelerometer device 33 is transmitted through resistor 73 which determines the gain of the device 33 and through high pass capacitor 74 to summing point 38. The altitude rate signal from device 40 after passing through the lead network comprising a resistor 76, shunted by a second resistance 77 and capacitor 79 in parallel, is connected to the summing point 38. The sum of the altitude rate signal as modified by lead network 41 and the vertical acceleration signal derived from devices 30, 33 passes to the lag arrangement 42. This lag arrangement comprises an integrating amplifier 80 having its output supplied through resistor 81 and resistor 82 and capacitor 83 in parallel in feedback relation to the input of amplifier 80 to provide the integration of the input. A capacitor 86 connects junction 43 of resistors 81, 82 to signal ground. The output $h_b$ from the integrator appearing on transmission means or conductor 43 is supplied through a resistor 84 to summing point 50 where it is summed with the altitude displacement signal from sensing device 48 transmitted thereto by a resistor 85. The sum of blended altitude rate and barometric altitude displacement at summing point 50 is supplied to lag device 51. Lag device 51 comprises an integrator 87 which in the present arrangement consists of an amplifier having its output supplied to the input in a feedback arrangement to provide a lagging effect on the output relative to the input. The output of amplifier 87 is transmitted through a resistor 88 and a second resistor 89 and capacitor 90 in parallel in the feedback arrangement to the input of the amplifier. The output of amplifier 87 appearing on transmission member 52 is the "blended" altitude displacement signal, $h_b$. From the member 52 the "blended" altitude displacement signal is transmitted through a variable resistance 90 and fixed resistance 91 in series to summing amplifier 46 which also receives the "blended" altitude rate signal, $\dot{h}_b$, from terminal 43 through a resistor 93. The blended altitude displacement and blended altitude rate signals are combined in the summing arrangement 46 consisting of a voltage amplifier 94 which receives the input signals by means of resistors 91 and 93 and has its output supplied through resistor 95 and 96 in series to its input. A capacitor 97 connects the junction of resistors 95, 96 to signal ground. The output from the summing device 46 is supplied to an attenuating network 58 comprising a resistor 100 connected to signal ground through a variable resistor 102. The terminal of the arrangement 58 and resistor 102 is connected through a resistor 103 and conductor 105 to an autopilot bridge 106.

The autopilot bridge is similar to the autopilot bridge 19 of the aforesaid Weber patent. In the present arrangement the autopilot bridge receives pitch attitude signals $\theta$ from the gyroscope 30 which is so mounted in the craft to be not only responsive to roll attitudes but also responsive to craft pitch attitudes. The autopilot bridge in turn through a servo 107 which comprises an amplifier and servomotor as in the Weber patent operates the control surface such as an elevator surface 108 of an aircraft. The servo arrangement utilizes a feedback 109 which operates a signal source in the autopilot bridge similar to the potentiometer 21 of the Weber application.

In FIGURE 4, in order to provide the lag device 42, the output of amplifier 80 is supplied through a lead network comprising resistor 82 and capacitor 83 in parallel to the input to the amplifier 80. The arrangement of the resistor and capacitor lead network in the feedback path results in a lagging effect on the output appearing at terminal 43. In a similar manner in the lag device 51 a voltage amplifier 87 has a feedback supplied through a lead network comprising resistor 89 and capacitor 90 in parallel to its input so that its output appearing on member 52 is lagged with respect to the input supplied thereto from summing point 50.

The summing arrangement 46 utilizes no lead network in its feedback path but merely utilizes straight feedback through the resistor 96 for the purpose of reducing the gain of the summing arrangement 46 to stabilize it.

It will now be apparent that there has been provided a novel arrangement responsive to a displacement error signal for maintaining a desired position of an aircraft automatically and such arrangement utilizes a "blended" displacement error signal derived from actual position displacement sensing devices as well as displacement rate and inertially responsive devices.

While one mechanical embodiment of the invention has been illustrated and described in detail, various changes and modifications in the form and relative arrangement of parts, which will now appear to those skilled in the art, may be made without departing from the spirit of the invention. Reference is therefore to be had to the appended claims for a definition of the limits or scope of the invention.

I claim:

1. An apparatus for obtaining a synthetic displacement signal which compensates for inaccuracies in the magnitude over a frequency range of interest of the natural displacement signal comprising, means supplying a signal corresponding to the rate of change of displacement; means for modifying said signal in accordnace with a gain factor $T_1$; means providing a second signal in accordance with the displacement quantity; means combining the first signal as modified and second signals; a lag device having a transfer function $$\frac{1}{T_1 s + 1}$$

wherein $T_1$ is the time constant of the lag device and $s$ is the conventional mathematical operator denoting a differentiation and wherein the gain factor $T_1$ is equal to the time constant $T_1$ in absolute magnitude, responsive to said combined signals; and further means controlled by said lag device.

2. Apparatus for obtaining a synthetic control signal voltage including compensations for inaccuracies in the actual signal over a frequency range of interest wherein the actual signal voltage is obtained, comprising: means supplying a signal voltage corresponding to the rate of change of said quantity; means for modifying said rate signal voltage in accordance with the gain factor T; means providing a second signal voltage in accordance with the magnitude of the quantity; means combining the modified first and second voltage signals; a lag device, having a transfer function $$\frac{1}{Ts+1}$$

wherein T is the time constant thereof and $s$ is the conventional mathematical operator denoting a differentiation and further wherein the gain factor T is equal to the time constant T in absolute magnitude, responsive to said combined voltage signals; and further means controlled by said lag device.

3. In apparatus for obtaining a synthetic or blended altitude displacement signal, means supplying a signal corresponding to vertical acceleration; means for modifying said first signal in accordance with a gain factor $T_2$; means providing a second signal in accordance with altitude rate; means for combining said rate and modified vertical acceleration signal; an integrator arrangement having an input connected to said combining means and an output; means for modifying said output in accordance with a gain factor $T_1$; means for supplying a third signal in accordance with altitude displacement; means combining said altitude displacement signal and modified integration output; a second integration device controlled by said second combining means; and means controlled by the output of said second integrator device whereby a synthetic displacement signal is provided which compensates for inaccuracies in the magnitude over the frequency range of interest of the actual altitude displacement signal.

4. Apparatus for obtaining a synthetic displacement signal, comprising: means for supplying a signal corresponding to the rate of change of displacement; means for modifying said signal in accordance with a gain factor $T_1$; means providing a second signal in accordance with the displacement quantity; means combining the first and second signals; a lag device having a transfer function $$\frac{1}{1+T_1 s}$$

wherein $T_1$ is the time constant thereof and $s$ is the conventional mathematical operator denoting a differentiation and wherein the gain factor $T_1$ is equal in absolute magnitude to the time constant and has the value 10:20, responsive to said combined signals, and further means controlled by said lag device, whereby the apparatus compensates for inaccuracies in the magnitude over a frequency range of interest of said displacement signal.

5. Control apparatus for an aircraft having a control surface operable to turn the craft about an axis comprising: means developing a signal corresponding to the rate of change of altitude; means for modifying said signal in accordance with a gain factor $T_1$; means providing a second signal in accordance with the magnitude of the altitude displacement; means combining the first and second signals; a lag device having a transfer function $$\frac{1}{T_1 s+1}$$

wherein $T_1$ is the time constant thereof and $s$ is the conventional mathematical operator denoting a differentiation and wherein the gain factor $T_1$ is equal to the time constant in absolute magnitude between the value of 10 and 20, responsive to said combined signals; and further means operating said control surface controlled by said lag device.

6. Control apparatus for an aircraft having a control surface operable to turn the craft about an axis thereof, comprising: means providing a signal voltage corresponding to a function of the rate of change of craft position; means for modifying said signal in accordance with a gain factor $T_2$; means providing a second signal voltage in accordance with the rate of change of position of the craft; means for combining the modified first and second signals; a lag device having a transfer function $$\frac{1}{T_2 s+1}$$

and controlled from said combining means; means providing a third signal voltage corresponding to the actual position of the craft; gain changing means modifying the output of the lag device in accordance with the factor $T_1$; means for combining said third signal voltage and the modified signal voltage from said lag device; an integrator having the transfer function $$\frac{1}{T_1 s}$$

responsive to said signal from the second combining means; and servomotor means operating said surface and controlled from said integrator.

7. Apparatus for obtaining a synthetic altitude rate signal including compensations for inaccuracies in the actual signal over a frequency range of interest wherein the actual signal is obtained, comprising: means supplying a signal corresponding to vertical acceleration; means modifying said acceleration signal in accordance with a gain factor $T$; means providing a second signal in accordance with the altitude rate; means combining the modified first and second signals; a lag device, having a transfer function $$\frac{1}{T s+1}$$

wherein $T$ is the time constant of the lag device and $s$ is the conventional mathematical operator denoting a differentiation and further wherein the absolute magnitude of the gain factor is equal to the time constant $T$, responsive to said combined signals; and further means controlled by the output of said lag device.

8. In flight control apparatus for an aircraft, means for obtaining a synthetic or blended flight control displacement signal comprising: means supplying a first signal corresponding to linear accelerations of the craft from a reference datum; means for modifying said first signal in accordance with a gain factor $T_2$; means providing a second signal in accordance with linear rate of the craft from the reference datum; means for combining said rate and modified acceleration signals; an integrator arrangement having an input connected to said combining means and an output supplied in feedback relationship to the combining means; means for further utilizing said output comprising a gain factor device $T_1$; means for supplying a third signal in accordance with linear displacement of the craft from the reference datum; second combining means receiving said linear displacement signal and signal from the gain device $T_1$; a second integration device controlled by said second combining means; means supplying the output of said second integration device in negative feedback relation to said second combining means; and means controlled by the output of said second integrator device whereby control from a synthetic displacement signal is provided.

9. In apparatus for obtaining a synthetic or blended altitude displacement signal; means supplying a signal corresponding to vertical acceleration; second means modifying said first signal in accordance with a gain factor $T_2$; a first integrator arrangement having an input connected to said second means and an output; means connecting said integrator output in negative feedback relation to the input thereof; a second gain means also receiving the output of said first integrator and modifying it in accordance with the gain factor $T_1$ to provide a second signal; means for supplying a third signal in accordance with altitude displacement; means combining said altitude displacement signal and modified integrator output or second signal; a second integrator device controlled by said combining means; means connecting the output of said second integrator in negative feedback relation to the input thereof; and additional means controlled by the output of said second integrator.

10. In flight control apparatus for an aircraft having an elevator control surface, a servomotor for operating said surface, and a pitch attitude signal generator and means for controlling said servomotor upon difference in outputs of said first signal generator and a second signal generator said second signal generator comprising: means supplying a signal corresponding to vertical acceleration of said craft, means modifying said acceleration signal in accordance with a gain factor $T_2$, means providing a second signal in accordance with altitude rate of the craft, means combining said altitude rate and modified acceleration signal, an integrator arrangement having an input connected to said combining means and an output-feedback means supplying at least a portion of said output to said combining means; further means responsive to said integrator output and varying the same in accordance with the gain factor $T_1$, means supplying a third signal in accordance with craft altitude displacement from a desired altitude, means combining said altitude displacement signal and the modified output of the integrator, a second integrator device controlled by said second combining means; second feedback means supplying the output of said second integrator to the input thereof, and additional means controlling the second signal generator in accordance with the output of said second integrator device to supply a synthetic altitude displacement for controlling said servomotor.

11. Means for providing a blended control signal derived from a plurality of different types of signal sensing devices, comprising: accelerometer means supplying a signal voltage corresponding to the acceleration of the craft with respect to a reference datum; means modifying said acceleration signal in accordance with a gain factor T; means providing a second signal in accordance with velocity of the craft with respect to the datum reference; means combining the modified first and second signals; a lag device having a transfer function $$\frac{1}{Ts+1}$$

wherein T is the time constant thereof and $s$ is the conventional mathematical operator denoting a differentiation and further wherein the gain factor T is equal in absolute magnitude to the time constant T, responsive to said combined signals; and further means controlled by the output of said lag device and controlling the flight of the craft with respect to said datum reference.

References Cited in the file of this patent

UNITED STATES PATENTS

| | | |
|---|---|---|
| 2,488,286 | Glenny | Nov. 15, 1949 |
| 2,875,965 | Anderson et al. | Mar. 3, 1959 |
| 2,898,538 | Rafferty | Aug. 4, 1959 |